United States Patent
Sheng et al.

(10) Patent No.: US 9,104,518 B2
(45) Date of Patent: Aug. 11, 2015

(54) WIRELESS COMMUNICATION TERMINAL AND METHOD FOR SECURELY RUNNING INDUSTRY SOFTWARE

(75) Inventors: Weiguang Sheng, Shenzhen (CN); Shaofeng Ma, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/369,589

(22) PCT Filed: Jun. 21, 2012

(86) PCT No.: PCT/CN2012/077373
§ 371 (c)(1),
(2), (4) Date: Jul. 18, 2014

(87) PCT Pub. No.: WO2013/097426
PCT Pub. Date: Jul. 4, 2013

(65) Prior Publication Data
US 2014/0366013 A1    Dec. 11, 2014

(30) Foreign Application Priority Data
Dec. 27, 2011  (CN) .......................... 2011 1 0445279

(51) Int. Cl.
*G06F 9/44*       (2006.01)
*G06F 9/445*     (2006.01)
(Continued)

(52) U.S. Cl.
CPC .. *G06F 8/61* (2013.01); *G06F 3/06* (2013.01); *G06F 9/44584* (2013.01);
(Continued)

(58) Field of Classification Search
CPC ............... G06F 8/60; G06F 8/61; G06F 8/65; G06F 8/67; G06F 8/68
See application file for complete search history.

(56) References Cited

U.S. PATENT DOCUMENTS 5,572,685 A     11/1996  Fisher et al.
8,612,540 B2 *  12/2013  He ................................ 709/217
(Continued)

FOREIGN PATENT DOCUMENTS

CN    1687916 A      10/2005
CN    101000594 A     7/2007
(Continued)

OTHER PUBLICATIONS

Patrick Nelson, "Run Your Software From a USB Stick for Security and Speed", Apr. 12, 2012, TechNewsWorld, pp. 1-3; <www.technewsworld.com/story/74846.html+&cd=1&hl=en&ct=clnk&gl=us>.*

(Continued)

*Primary Examiner* — Thuy Dao
*Assistant Examiner* — Ben C Wang
(74) *Attorney, Agent, or Firm* — Oppedahl Patent Law Firm LLC

(57) ABSTRACT

A method for securely running industry software. Industry software and data are stored in an internal storage medium of a wireless communication terminal. A user interface (UI) of the wireless communication terminal includes a UI-customized Small Computer System Interface (SCSI) instruction processing module, and the wireless communication terminal includes a customized SCSI instruction processing module in the wireless communication terminal. The UI sends a customized SCSI instruction from the UI-customized SCSI instruction processing module to interact with the customized SCSI processing module in the wireless communication terminal, so as to load the industry software and the data into a memory of a Personal Computer (PC) to run the industry software and the data in the memory of the PC. After the data are updated, the UI sends a customized SCSI instruction to write updated software or the updated data back into the storage medium of the wireless communication terminal.

6 Claims, 2 Drawing Sheets

(51) Int. Cl.
*H04L 29/08* (2006.01)
*G06F 13/42* (2006.01)
*G06F 21/62* (2013.01)
*G06F 3/06* (2006.01)
*G06F 21/78* (2013.01)

(52) U.S. Cl.
CPC ....... *G06F 13/4282* (2013.01); *G06F 21/6218* (2013.01); *G06F 21/78* (2013.01); *H04L 67/14* (2013.01); *G06F 8/60* (2013.01); *G06F 8/65* (2013.01); *G06F 8/67* (2013.01)

(56) References Cited

U.S. PATENT DOCUMENTS

| | | | |
|---|---|---|---|
| 2002/0188941 A1* | 12/2002 | Cicciarelli et al. | 717/175 |
| 2003/0028869 A1* | 2/2003 | Drake et al. | 717/177 |
| 2003/0037328 A1* | 2/2003 | Cicciarelli et al. | 717/178 |
| 2003/0159137 A1* | 8/2003 | Drake et al. | 717/172 |
| 2003/0163807 A1* | 8/2003 | Drake et al. | 717/174 |
| 2006/0130004 A1 | 6/2006 | Hughes | |
| 2006/0282577 A1 | 12/2006 | Huang et al. | |
| 2009/0119659 A1* | 5/2009 | Zou et al. | 717/173 |
| 2010/0064036 A1* | 3/2010 | Li et al. | 709/222 |
| 2010/0132042 A1* | 5/2010 | Zhang | 726/24 |
| 2010/0325180 A1* | 12/2010 | Lee | 707/823 |
| 2011/0019774 A1* | 1/2011 | Furuta | 375/340 |
| 2012/0093207 A1* | 4/2012 | Toon | 375/222 |
| 2012/0110292 A1* | 5/2012 | Martini | 711/163 |
| 2012/0294188 A1* | 11/2012 | Liao et al. | 370/254 |
| 2012/0304227 A1* | 11/2012 | Wu et al. | 725/39 |
| 2013/0047212 A1* | 2/2013 | Fang et al. | 726/3 |
| 2013/0290951 A1* | 10/2013 | Domsch et al. | 717/178 |
| 2014/0010165 A1* | 1/2014 | Ouyang | 370/328 |
| 2014/0115194 A1* | 4/2014 | Qu | 710/8 |

FOREIGN PATENT DOCUMENTS

| | | | | |
|---|---|---|---|---|
| CN | 101051292 A | 10/2007 | | |
| CN | 101334736 A | 12/2008 | | |
| CN | 101661442 A | 3/2010 | | |
| CN | 102073524 A | 5/2011 | | |
| CN | 102088797 A | 6/2011 | | |
| EP | 0674274 A1 | 9/1995 | | |
| EP | 1672509 A2 | 6/2006 | | |
| EP | 2234010 A1 | 9/2010 | | |
| EP | 2535846 A1 | 12/2012 | | |
| JP | 2007193448 A | 8/2007 | | |
| TW | EP 2234010 A1 * | 9/2010 | | G06F 3/06 |
| WO | 2011097794 A1 | 8/2011 | | |

OTHER PUBLICATIONS

Ravi et al., "Securing Pocket Hard Drives", Oct. 15, 2007 IEEE, pp. 18-23; <http://ieeexplore.ieee.org/stamp/stamp.jsp?tp=&arnumber=4343894>.*

Cho et al., "Active Disk Meets Flash: A case for Intelligent SSDs", 2013 ACM, ICS'13 Jun. 10, 2013, pp. 91-102; <http://dl.acm.org/citation.cfm?id=2465003>.*

International Search Report in international application No. PCT/CN2012/077373, mailed on Oct. 4, 2012. (2 pages—see entire document).

English Translation of the Written Opinion of the International Search Authority in international application No. PCT/CN2012/077373, mailed on Oct. 4, 2012. (5 pages—see entire document).

Supplementary European Search Report in European application No. 12862751.0, mailed on Apr. 30, 2015.

* cited by examiner

WIRELESS COMMUNICATION TERMINAL AND METHOD FOR SECURELY RUNNING INDUSTRY SOFTWARE

TECHNICAL FIELD

The disclosure relates to the field of communication technologies, and in particular to a wireless communication terminal and a method for securely running industry software.

BACKGROUND

As 3G is commercially applied on a large scale, wireless-data-card-type communication products are being used more and more widely. Most of data cards have a self-starting installation function, with which a data card is enumerated as an installation disc when inserted into a Personal Computer (PC) installed with no driver and User Interfere (UI), so that an installation program in the disc runs automatically to install a driver and a UI.

Industry software refers to software which is specially developed for a certain industry and therefore has an obvious industrial feature. Industry software, which has characteristics including high pertinence and operational ease, is specifically classified into: financial software, Enterprise Resource Planning (ERP) software, design software, project cost software, construction material software and the like Existing industry software, before being used, need to be installed in a disc of a PC to install software and relevant data in the disc of the PC, and the software and the relevant data, when being run, are loaded from the disc of the PC into a memory and run in the memory. As the Internet is being used more and more widely, the categories of new computer viruses increase and the computer viruses spread at a much higher speed, which makes the industry software and data stored in the disc of the PC easily destroyed or stolen by viruses and Trojans.

SUMMARY

To overcome the foregoing defects, the disclosure provides a wireless communication terminal and a method for securely running industry software.

To this end, the disclosure provides a method for securely running industry software, which includes that:

industry software and data are stored in an internal storage medium of a wireless communication terminal, wherein a User Interface (UI) of the wireless communication terminal includes a UI-customized Small Computer System Interface (SCSI) instruction processing module, and the wireless communication terminal includes a customized SCSI instruction processing module in the wireless communication terminal;

the UI sends a customized SCSI instruction from the UI-customized SCSI instruction processing module to interact with the customized SCSI processing module in the wireless communication terminal, so as to load the industry software and the data into a memory of a Personal Computer (PC) to run the industry software and the data in the memory of the PC; and after the data are updated, the UI sends a customized SCSI instruction to write updated software or the updated data back into the internal storage medium of the wireless communication terminal.

Further, the internal storage medium of the wireless communication terminal may be a flash memory or T card.

Further, the industry software and the data stored in the internal storage medium of the wireless communication terminal may be loaded from the internal storage medium of the wireless communication terminal into the PC to be run only when there is a need to run the industry software.

Further, the wireless communication terminal may be a data card.

The disclosure also provides a wireless communication terminal, which includes: a storage medium, UI software, and a customized SCSI instruction processing module in the wireless communication terminal; and industry software and data are stored in the storage medium.

The disclosure also provides a wireless communication terminal, which includes: a storage medium, a UI, and a customized SCSI instruction processing module in the wireless communication terminal; wherein the storage medium is configured to store industry software and data; and the UI includes a UI-customized SCSI instruction processing module, and is configured to: send a customized SCSI instruction from the UI-customized SCSI instruction processing module to interact with the customized SCSI instruction processing module in the wireless communication terminal, so as to load the industry software and the data into a memory of a PC to run the industry software and the data in the memory of the PC; and after the data are updated, send a customized SCSI instruction to write updated software or the updated data back into the storage medium.

Further, the storage medium of the wireless communication terminal may be a flash memory or T card.

Further, the industry software and the data stored in the storage medium may be loaded from the storage medium to the PC to be run only when there is a need to run the industry software.

Further, the wireless communication terminal may be a data card.

In conclusion, the disclosure has the following beneficial effects:

Since industry software and data are stored in an internal storage medium of a wireless communication terminal, the industry software and the data are loaded from the wireless communication terminal into the PC to be run only when there is a need to run the industry software, and the internal storage medium in the wireless communication terminal is read/written by using a customized SCSI instruction, the disclosure lowers the risk that the industry software and the data are tampered and stolen, and thus greatly enhances security. Moreover, as the industry software may be run at any location where a PC is provided as long as a user carries the wireless communication terminal, the industry software can be conveniently carried and used, which improves user experience.

DETAILED DESCRIPTION

Figure 1:
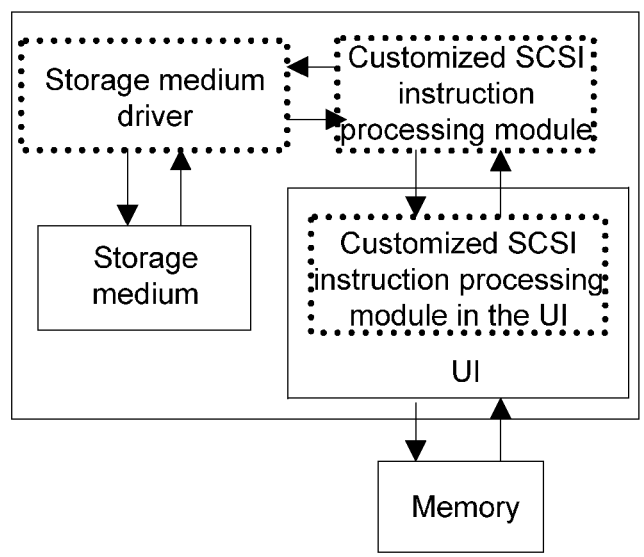
FIG. 1 is a schematic diagram illustrating a structure of a data card according to an embodiment of the disclosure.

According to the technical solution of the disclosure, industry software and relevant data are stored in an internal storage medium, such as a flash memory or a T card, of a wireless communication terminal. A customized SCSI instruction processing module is added in a UI and the wireless communication terminal, the industry software and data stored in the internal storage medium of the wireless communication terminal can only be read/written by using a customized SCSI instruction. When there is a need to run the industry software, the UI sends a customized SCSI instruction to load the industry software and the data into a memory of a PC to run the industry software and the data in the memory of the PC, and sends a customized SCSI instruction after the completion of the running to write the updated software and data back into the wireless communication terminal. Therefore, there is no copy of the industry software and the data in the CP, thereby achieving the secure use of the industry software and improving the security of the industry software.

Following embodiments are described by taking a data card as an example of the wireless communication terminal.

Generally, there is a risk that industry software and data stored in a disc of a PC are tampered by viruses or Trojans and important information is stolen when the PC is infected with the viruses or Trojans. In the disclosure, industry software and data are stored in an internal storage medium of a data card, and the industry software and the data are loaded from the data card into a PC to be run only when there is a need to run the industry software. Moreover, the internal storage medium of the data card is read/written by using a customized SCSI instruction. Therefore, the risk that the industry software and the data are tampered and stolen is lowered, thus greatly enhancing the security of the industry software. To enhance the portability and usability of the industry software, instead of being installed in a disc of a PC, the industry software and the data are stored in a data card which is provided with a self-starting function and automatically installs a driver and a UI when the data card is inserted into a PC equipped with no UI. When the industry software is run, the UI can directly load the industry software and the data from the internal storage medium of the data card into the memory of the PC to run the industry software and the data in the memory of the PC. Meanwhile, the data card is provided with an Internet access function, with which the industry software can access a network background service and can be run at any location where a PC is provided as long as the user carries the data card. Thus, it is convenient to carry and use the industry software, and user experience is improved.

The data card is provided with the self-starting function, the industry software and the data are stored in the internal storage medium of the data card, the UI of the data card includes a UI-customized SCSI instruction processing module, and the data card includes a customized SCSI instruction processing module in the data card. The UI sends a customized SCSI instruction from the UI-customized SCSI instruction processing module to interact with the customized SCSI instruction processing module in the data card, so as to load the industry software and the data into a memory of a PC to run the industry software and the data in the memory of the PC. After the data are updated, the UI sends a customized SCSI instruction to write updated software and the updated data back into the storage medium of the data card.

Following descriptions are given based on an example of the storage of industry software and data in a T card in a data card, however, the storage medium is not limited to the T card. In the disclosure, industry software and data are stored in a partition of the T card which is hidden by using tool software, so as to enhance security.

The technical solution of the disclosure is further elaborated below in combination with the drawings and specific embodiments.

Referring to FIG. 1 which illustrates a structure of a data card according to an embodiment, the data card includes a storage medium, a customized SCSI instruction processing module in the data card, and a UI. The UI of the data card installed on a PC interacts with the data card by sending a UI-customized SCSI instruction, so as to operate industry software and relevant data in a hidden partition of the T card in the data card. In the disclosure, the industry software and the relevant data are stored in the hidden partition of the T card in a data card rather than a disc of a PC, the UI and the data card both internally include a customized SCSI instruction processing module. The UI installed and run on a PC includes a UI-customized SCSI instruction module, which takes charge of sending a customized SCSI instruction to the data card to exchange data with the data card, so as to load the industry software and the relevant data to the memory of the PC to run the industry software and the relevant data in the memory of the PC, and write the updated relevant data back into the hidden partition of the T card in the data card. The data card includes a customized SCSI instruction processing module in the data card, which takes charge of receiving and parsing the customized SCSI instruction sent from the UI-customized SCSI instruction module and reading/writing data in the hidden partition of the T card in the data card according to a specific SCSI instruction.

The data card further includes a storage medium driver configured to drive the storage medium to store data.

Figure 2:
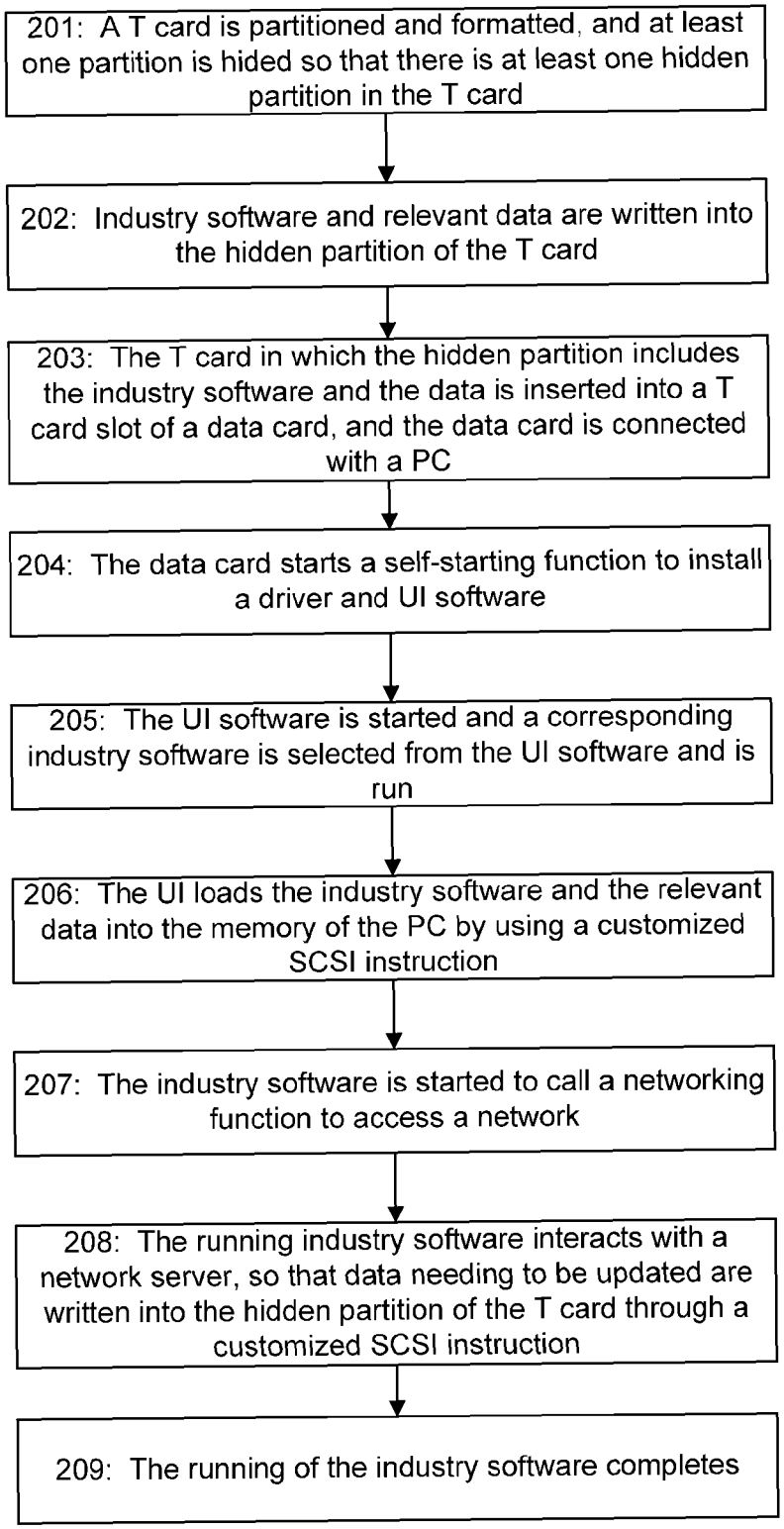
FIG. 2 is a flowchart illustrating a method for securely running industry software according to an embodiment of the disclosure.

Referring to FIG. 2 which illustrates a flow of a method for securely running industry software according to an embodiment of the disclosure, the method includes the following steps:

Step 201: A T card is partitioned and formatted, and at least one partition is hided so that there is at least one hidden partition in the T card.

Step 202: Industry software and relevant data are written into the hidden partition of the T card.

Step 203: The T card in which the hidden partition includes the industry software and the data is inserted into a T card slot of a data card, and the data card is connected with a PC.

Step 204: The data card starts a self-starting function to install a driver and UI software.

The data card providing with the self-starting function is automatically enumerated as an installer disc to complete the installation of a drive program and the UI software.

Step 205: The UI software is started and a corresponding industry software is selected from the UI software and is run.

Step 206: The UI loads the industry software and the relevant data into the memory of the PC by using a customized SCSI instruction.

Through the interaction of the UI-customized SCSI instruction processing module in the UI with the customized SCSI instruction processing module in the data card, the UI loads the industry software and the relevant data from the hidden partition of the T card into the memory of the PC.

Step 207: The industry software is started to call a networking function to access a network.

After the loading is completed, the UI starts the industry software, and then the industry software calls the networking function of the data card to access a 3G network as needed.

Step 208: The running industry software interacts with a network server, so that data needing to be updated are written into the hidden partition of the T card through a customized SCSI instruction.

The industry software in a running state accesses a network background service by means of the networking function provided by the data card. When there is data updating, the UI sends a customized SCSI instruction to write the data back into the hidden partition of the T card in the data card.

Step 209: The running of the industry software completes.

The industry software exits after the running completes, and the updated industry software and data are written back into the hidden partition of the T card in the data card through a customized SCSI instruction, without any copy retained in the PC.

Step 201 is executed only when the data card is initially used or when it is desired to change the size of the hidden partition.

Step 202 is executed only when the data card is initially used or when it is desired to replace the industry software.

Step 204 is executed only when the data card is used on a PC on which the data card is not used.

Certainly, there may also be many other implementation modes of the disclosure, and those skilled in the art can make various modifications and variations to the disclosure without departing from the concept and essence of the disclosure. Any modification, equivalent substitute, modification or the like made within the concept and principle of the disclosure shall fall within the scope of protection of the claims the disclosure

The invention claimed is:

1. A method for securely running industry software, comprising:

storing industry software and data in an internal storage medium of a wireless communication terminal, wherein a User Interface (UI) port of the wireless communication terminal comprises a UI-customized Small Computer System Interface (SCSI) instruction processor, and the wireless communication terminal comprises a customized SCSI instruction processor in the wireless communication terminal;

sending, by the UI port, a customized SCSI instruction from the UI-customized SCSI instruction processor to interact with the customized SCSI processor in the wireless communication terminal, so as to load the industry software and the data into a memory of a Personal Computer (PC) to run the industry software and the data in the memory of the PC; and after the data are updated, sending, by the UI port, a customized SCSI instruction to write updated software and the updated data back into the internal storage medium of the wireless communication terminal, wherein the industry software and the data stored in the internal storage medium of the wireless communication terminal are loaded from the internal storage medium of the wireless communication terminal into the PC to be run only when there is a need to run the industry software, the running industry software calls and interacts with a network server so that the data needing to be updated are written into a hidden partition of a card through a customized SCSI instruction.

2. The method according to claim 1, wherein the internal storage medium of the wireless communication terminal is a flash memory or a T card.

3. The method according to claim 1, wherein the wireless communication terminal is a data card.

4. A wireless communication terminal, comprising: a storage medium, a User Interface (UI) port, and a customized Small Computer System Interface (SCSI) instruction processor; wherein the storage medium is configured to store industry software and data; and the UI port comprises a UI-customized SCSI instruction processor, and is configured to: send a customized SCSI instruction from the UI-customized SCSI instruction processor to interact with the customized SCSI instruction processor in the wireless communication terminal, so as to load the industry software and the data into a memory of a Personal Computer (PC) to run the industry software and the data in the memory of the PC; and after the data are updated, send a customized SCSI instruction to write updated software and the updated data back into the storage medium of the wireless communication terminal, wherein the industry software and the data stored in the internal storage medium of the wireless communication terminal are loaded from the internal storage medium of the wireless communication terminal into the PC to be run only when there is a need to run the industry software, the running industry software calls and interacts with a network server so that the data needing to be updated are written into a hidden partition of a card through a customized SCSI instruction.

5. The wireless communication terminal according to claim 4, wherein the storage medium of the wireless communication terminal is a flash memory or a T card.

6. The wireless communication terminal according to claim 4, wherein the wireless communication terminal is a data card.

* * * * *